2,109,032
Patented Oct. 29, 1963

3,109,032
BIS(DICHLOROVINYL) DISULFIDES
Paul C. Aichenegg, Prairie Village, Kans., assignor to Chemagro Corporation, New York, N.Y., a corporation of New York
No Drawing. Filed July 28, 1961, Ser. No. 127,497
4 Claims. (Cl. 260—608)

This invention relates to unsaturated disulfides.

It is an object of the present invention to prepare novel halogenated disulfides.

Another object is to prepare compounds suitable for use as nematocides, fungicides and insecticides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing symmetrical compounds having the formula

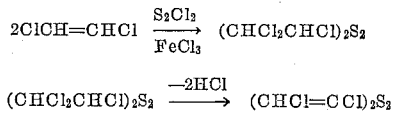

wherein at least 2 of X, Y and Z are halogen of atomic weight between 35 and 80, i.e., they are chlorine or bromine, and the remaining member of X, Y and Z is hydrogen or halogen of atomic weight between 35 and 80 and A, M and Q are defined in the same manner as X, Y and Z.

Typical examples of compounds within the present invention are bis(1,2-dichlorovinyl) disulfide, $(CHCl=CCl)_2S_2$ bis(2,2-dichlorovinyl) disulfide, $(CCl=CH)_2S_2$; bis(1,2,2-trichlorovinyl) disulfide, $(CCl_2=CCl)_2S_2$; bis (1,2-dibromovinyl) disulfide; bis(2,2-dibromovinyl) disulfide; bis(1,2,2-tribromovinyl) disulfide; bis(1-bromo-2-chlorovinyl) disulfide; bis(1-chloro-2-bromovinyl) disulfide; bis(1-bromo-2,2-dichlorovinyl) disulfide; bis(1-chloro-2,2-dibromovinyl) disulfide; bis(1,2-dibromo-2-chlorovinyl) disulfide; bis(1,2-dichloro-2-bromovinyl) disulfide.

The preferred compounds are bis(1,2-dichlorovinyl) disulfide and bis(2,2-dichlorovinyl) disulfide.

The compounds of the present invention can be made by dehydrohalogenating the corresponding bis haloethyl disulfides, such as bis(1,2,2-trichloroethyl) disulfide; bis-(2,2,2-trichloroethyl) disulfide; bis(1,2,2,2-tetrachloroethyl) disulfide; bis(1,2,2-tribromoethyl) disulfide; bis(2,2,2-tribromoethyl) disulfide; bis(1,2,2,2-tetrabromoethyl) disulfide; bis(1,2-dichloro-2,2-dibromoethyl) disulfide, etc. The dehydrohalogenation is preferably carried out in the presence of a tertiary base.

The haloethyl disulfides can be prepared by reacting sulfur monochloride or sulfur monobromide with the appropriate polyhaloethylene. As the polyhaloethylene there can be employed 1,2-dichloroethylene (in either the cis or transform); vinylidene chloride, trichloroethylene; 1,2-dibromoethylene; vinylidene bromide; tribromoethylene; 1-chloro-2-bromoethylene; 1-chloro - 1 - bromoethylene; 1,1-dichloro-2-bromoethylene; 1,1-dibromo - 2-chloroethylene; 1,2-dibromo-1-chloroethylene and 1,2-dichloro-1-bromoethylene.

A Friedel-Crafts catalyst, e.g., ferric chloride, aluminum chloride or the like, is suspended in the polyhaloethylene and sulfur monochloride or sulfur monobromide is gradually added in order to form the polyhaloethyl disulfide. Two mols of polyhaloethylene are required per mol of sulfur monochloride, e.g., $2ClCH=CHCl \xrightarrow[FeCl_3]{S_2Cl_2} (CHCl_2CHCl)_2S_2$

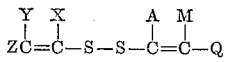

$(CHCl_2CHCl)_2S_2 \xrightarrow{-2HCl} (CHCl=CCl)_2S_2$

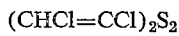

Desirably, an excess of the polyhaloethylene, e.g., a 20 to 100% excess, is employed.

The preferred dehydrohalogenating agent is a tertiary amine such as triethyl amine, tributyl amine, pyridine or the like. Strong alkalis such as potassium hydroxide or ammonia can also be used but give more tar formation. Alkali carbonates such as potassium carbonate and sodium carbonate and alkaline earth oxides, e.g., calcium oxide and barium oxide in aqueous alcohol or aqueous acetone solution give less tar formation than the strong alkalis.

To suppress tar formation further it is desired to add polymerization inhibitors such as hydroquinone to the dehydrohalogenation mixture.

Unless otherwise indicated, all parts and percentages are by weight.

*Example 1*

To a well stirred solution of 7 grams anhydrous ferric chloride in 400 grams (approximately 4 moles) of 1,2-dichloroethylene (cis/trans ratio 63/37) 135 grams (1 mole) of sulfur monochloride were added dropwise at a rate to maintain the reaction temperature between 40 and 45° C. (at higher addition rates occasional cooling is desired). After addition of the sulfur monochloride was complete, the temperature was raised to 65° C. (slight reflux was noted) and kept at this temperature for a further two hours.

After standing overnight at room temperature, the ferric chloride catalyst was removed by diluting the mixture with one volume of acetone followed by the addition of sufficient water to obtain separation into two layers. The top layer was discarded. This separation procedure was repeated and there was obtained an acetone containing dichloroethylene solution of bis(1,2,2 - trichloroethyl) disulfide essentially free of catalyst. Most of the acetone was then removed by repeated washing with water and the solution dried over anhydrous magnesium sulfate. There was obtained 323 grams (a 98% yield) of crude bis(1,2,2-trichloroethyl) disulfide as a dark oil after stripping off the excess 1,2-dichloroethylene under vacuum. The crude 1,2,2-trichloroethyl disulfide was purified by vacuum distillation, B._{.35} 126° C., B._{.01} 83° C. light yellow oil, $n_D^{20}$ 1.5912, $d_{20}^{20}$ 1,697, Cl 64.7% (theoretical 64.4%), S 19.4% (theoretical 19.5%). The infra-red spectrum showed strong absorption bands at 715–728 and 1010 cm.$^{-1}$ which are absent in bis(2,2-dichlorovinyl) disulfide.

In repeated experiments 80–90% yields of the purified distilled bis(1,2,2-trichloroethyl) disulfide were obtained.

The crude material was also purified by chromatography. 510 grams of crude bis(1,2,2-trichloroethyl) disulfide by chromatography on acid washed alumina in n-heptane or ligroin gave 490 grams or a 95% yield of pure bis(1,2,2-trichloroethyl) disulfide $n_D^{20}$ 1.591.

In several dehydrochlorination experiments the yields of bis(1,2-dichlorovinyl) disulfide ranged between 50 and 70% at temperatures between 20 and 60° C.

*Example 2*

32.9 grams of bis(1,2,2-trichloroethyl) disulfide (0.1 mole) were dissolved in 100 ml. of dry benzene containing one gram of hydroquinone and dehydrochlorinated by the dropwise addition under agitation of 20.4 grams (0.2 mole plus a slight excess) of triethylamine at between 20 and 28° C. The reaction was exothermic and occasional cooling by means of a cold water bath was employed. Twenty more minutes of stirring at room temperature, washing the organic layer with water to remove the formed triethylamine hydrochloride, drying over anhydrous magnesium sulfate and stripping gave 22 grams or 86% yield of crude bis(1,2-dichlorovinyl) disulfide as a dark oil.

The latter was distilled at 105–115° C. at 0.5–0.7 mm. mercury pressure and 18.3 grams (71%) of bis(1,2-dichlorovinyl) disulfide was obtained as an orange oil consisting of a mixture of fractions having $n_D^{20}$=1.6117–1.6176. Infra-red analysis of the latter gave a 74% bis(1,2-dichlorovinyl) disulfide content, the remaining 26% being mainly bis(1,2,2-trichloroethyl) disulfide. The total yield of pure bis(1,2-dichlorovinyl) disulfide was, therefore, 53%.

*Example 3*

65.8 grams of bis(1,2,2-trichloroethyl) disulfide (0.2 mole) were dissolved in n-heptane containing 2 grams of hydroquinone at room temperature and treated with 40.8 grams (0.4 mole plus a slight excess) of triethyl amine over a two hour period at 27° C. in the same way as described in Example 2. One further hour's agitation at room temperature, washing with water and drying over anhydrous magnesium sulfate gave an n-heptane solution (775 ml.) containing 44 grams (86% yield) of crude bis(1,2-dichlorovinyl) disulfide. Distillation as in Example 2 resulted in a 56% yield of the pure bis(1,2-dichlorovinyl) disulfide by infra-red analysis.

*Example 4*

460 grams (1.4 moles) of bis(1,2,2-trichloroethyl) disulfide were dissolved in one liter of benzene. 10 grams of hydroquinone were added and the mixture heated to 45–50° C. At this temperature 290 grams (2.8 moles plus a slight excess) of triethylamine were added dropwise with stirring over a 3 hour period. After standing overnight, removing the formed triethylamine hydrochloride by repeated washing of the organic layer with water, drying over anhydrous magnesium sulfate and stripping, there was obtained 325 grams of crude material which was chromatographed in n-heptane over alumina using a 3 foot column. 270.5 grams of crude bis(1,2-dichlorovinyl) disulfide was obtained (86.5% yield) containing 182.3 grams of pure bis(1,2-dichlorovinyl) disulfide (58% yield).

The chromatographic method was by far the superior method for preparing highly purified bis(1,2-dichlorovinyl) disulfide.

The crude mixture of bis(1,2-dichlorovinyl) disulfide and bis(1,2,2-trichloroethyl) disulfide, as indicated above, was chromatographed on alumina in n-heptane as a solvent and gave pure bis(1,2-dichlorovinyl) disulfide as an orange oil boiling at 0.023–0.025 mm. at 85–90° C. using a Rota Film molecular still and having an $n_D^{20}$ 1.6371; $d_{20}^{20}$ 1.617; Cl 55.4% (theoretical 55.5%); S 25.1% (theoretical 25.0%). The standard IR spectrum showed absorption for the double bond at 1560 and 920 cm.$^{-1}$. The peaks characteristic for bis(1,2,2-trichloroethyl) disulfide set forth in Example 1 were missing.

It was not possible to separate bis(1,2-dichlorovinyl) disulfide from bis(1,2,2-trichloroethyl) disulfide by a single vacuum distillation. When a sample containing 90% of bis(1,2-dichlorovinyl) disulfide was subjected to steam distillation, more than 50% of the starting material distilled as a yellow oil having a purity improved to 96%. Some impurities present in the original starting material and hydrolysis products were also noted.

*Example 5*

To 800 grams (8 moles) of vinylidene chloride were added 24.0 grams of anhydrous ferric chloride with agitation. Then 270 grams (2 moles) of sulfur monochloride were added dropwise with stirring over a period of approximately two hours. Thus, the vinylidene chloride was used in a 100% excess over the calculated amount required for reaction. The excess served as a diluent. During the sulfur monochloride addition, the reaction temperature adjusted itself at first to 26° C., slowly rose to 38° C. and then maintained a gentle reflux throughout the remainder of the addition period. (Cooling can be employed to maintain the gentle reflux.)

After standing overnight, the ferric chloride catalyst was removed with acetone and water as described in Example 1. The acetone containing vinylidene chloride solution of the product was washed with water to remove most of the acetone, the product was dried over anhydrous magnesium sulfate and stripped to give 643 grams or a yield of 98% of crude bis(2,2,2-trichloroethyl) disulfide as a dark brown oil which solidified upon standing. The crude product was purified by vacuum distillation accompanied by some decomposition. Pure bis(2,2,2-trichloroethyl) disulfide is a light yellow oil, B.$_{0.36-0.46}$ 145–150° C., $n_D^{20}$ 1.5780–1.5786, $d_{20}^{20}$ 1.649. The pure oil rapidly solidified on seeding or supercooling, M.P. 52° C. Recrystallization of the crude product was possible from ligroin. Cl 64.5% (theory 64.7%); S 19.4% (theory 19.5%). The IR spectrum showed strong bands at 690–720, 1035, 1240 and 1390 cm.$^{-1}$ which are weak or missing in the spectrum of bis(2,2-dichlorovinyl) disulfide.

*Example 6*

168 grams of crude bis(2,2,2-trichloroethyl) disulfide (0.51 mole) were dissolved in 400 ml. benzene and heated to 57° C. The heat source was removed and 110 grams of triethylamine (1 mole plus a slight excess) were added with stirring at a rate to insure a smooth reaction. The triethylamine hydrochloride formation was rapid and slightly exothermic causing a temperature rise to 62° C. at the end of the triethylamine addition. The reaction mixture was allowed to stand overnight, the amine salt removed by filtration followed by washing with sodium chloride containing dilute hydrochloric acid, followed by washing with dilute aqueous sodium chloride and then with water. The organic layer was dried over anhydrous magnesium sulfate and stripped to give 121 grams or a 95% yield of crude bis(2,2-dichlorovinyl) disulfide as a dark oil. The crude material yielded 73% of bis(2,2-dichlorovinyl) disulfide on vacuum distillation as an orange oil, B.$_{0.01}$ 85–87° C., $n_D^{20}$ 1.6202, $d_{20}^{20}$ 1.590.

Purification by chromatography in n-heptane on alumina gave a minimum of 83% pure bis(2,2-dichlorovinyl) disulfide as an orange oil $n_D^{20}$ 1.6204, $d_{20}^{20}$ 1.590.

IR data of the pure bis(2,2-dichlorovinyl) disulfide showed strong absorptions for the C—C double bonds including 1550 cm.$^{-1}$ which peak is missing from the infra-red spectrum of bis(2,2,2-trichloroethyl) disulfide.

Analysis of the pure bis(2,2-dichlorovinyl) disulfide gave Cl 55.8% (theory 55.5%), S 24.6% (theory 25.0%).

*Example 7*

To a well stirred suspension of 15 grams of ferric chloride in 840 grams of trichloroethylene (60% excess over the 4 moles required for the reaction) were gradually added 270 grams of sulfur monochloride (2 moles) at 88–90° C. while maintaining a gentle reflux. The reaction was allowed to stand overnight at room temperature, the ferric chloride removed as described in Example 1 by diluting with one volume of acetone followed by precipitation of the organic layer by addition of water, removal of most of the acetone by repeated water washing of the trichloroethylene solution and then drying over anhydrous magnesium sulfate and subjecting the dried product to vacuum stripping. 712 grams or a yield of 89% of crude bis(1,2,2,2-tetrachloroethyl) disulfide were obtained as a dark red oil. Analysis of the material gave for Cl 70.4% (theory 71.3%) and for S 15.4% (theory 16.1%). IR scan showed a small amount of unsaturation (at 832, 978 and 1538 cm.$^{-1}$) formed by some slight loss of hydrogen chloride caused by heating.

32 grams of the crude product gave a total distillate of 24.5 grams or 77% containing 21.5 grams of two major fractions boiling at 130–135° C. at 0.05 mm. having $n_D^{20}$ of 1.6005–1.6042 and analyzing for chlorine and sulfur close to the theoretical values. IR spectra of these fractions revealed small amounts of unsaturation.

In order to remove the small amounts of unsaturated material present in the bis(1,2,2,2-tetrachloroethyl) disulfide 30 grams of the crude material was chromatographed on alumina in n-heptane as the solvent. 25 grams or 83% was recovered in three separate fractions.

| Fraction | Weight (gms.) | $n_D^{20}$ | $d_{20}^{20}$ |
|---|---|---|---|
| 1 | 1.0 | 1.6560 | |
| 2 | 22.0 | 1.6041 | 1.760 |
| 3 | 2.0 | 1.6029 | |

Fractions 2 and 3 were combined and 10 grams thereof chromatographed again in the same manner.

| Fraction | Weight (gms.) | $n_D^{20}$ | $d_{20}^{20}$ | IR Analysis |
|---|---|---|---|---|
| 1 | 4 | 1.6030 | | Less than 5% unsaturation. |
| 2 | 3 | 1.5965 | 1.792 | Less than 3% unsaturation. |
| 3 | 2 | 1.5955 | | Less than 1% unsaturation. |

The purified bis(1,2,2,2-tetrachloroethyl) disulfide was a yellow oil B.$_{0.04}$ 133–135° C., $n_D^{20}$ 1.5955, $d_{20}^{20}$ 1.792, Cl 70.3% (theory 71.3%), S 16.3% (theory 16.1%). The IR spectrum showed strong absorptions at 700–720, 745–760, 810, 1050, 1175 and 1240 cm.$^{-1}$.

*Example 8*

To 398 grams (1 mole) of bis(1,2,2,2-tetrachloroethyl) disulfide diluted with one liter of benzene there were added 210 grams (2 moles plus a slight excess) of triethylamine dropwise with stirring at room temperature. The reaction was exothermic and occasional cooling was employed to keep the reaction temperature between 35 and 40° C. throughout the total addition period. After allowing the reaction mixture to stand overnight, the formed triethylamine hydrochloride was removed by filtration and washing the benzene solution with water. The excess unreacted triethylamine was extracted with dilute aqueous hydrochloric acid. The organic layer was dried over anhydrous magnesium sulfate and the solvent removed by vacuum stripping to give 318.5 grams or 98.5% yield of crude bis(1,2,2-trichlorovinyl) disulfide as a dark reddish oil.

14 grams of the crude product was purified by distillation in high vacuum. There occurred noticeable decomposition under loss of vacuum.

| Fraction | B., °C. | mm. Hg | Weight (gms.) | $n_D^{20}$ |
|---|---|---|---|---|
| 1 | 87–90 | 0.010 | 0.5 | 1.6102 |
| 2 | 97–100 | 0.020 | 1.5 | 1.6155 |
| 3 | 110–115 | 0.030 | 3.5 | 1.6260 |
| 4 | 115–118 | 0.040 | 1.0 | 1.6360 |

Analysis of fraction 3 was Cl 64.6% (theory 65.5%) S 18.4% (theory 19.7%).

In another experiment 100 grams of crude bis (1,2,2-trichlorovinyl) disulfide was chromatographed on alumina in n-heptane as a solvent with the following results:

| Fraction | Weight (gms.) | $n_D^{20}$ | IR Analysis |
|---|---|---|---|
| 1 | 1 | 1.6388 | High purity. |
| 2 | 42 | 1.6415 | Better than 95%. |
| 3 | 13 | 1.6402 | Better than 93%. |

Fraction 2 was chromatographed again and $n_D^{20}$ between 1.6425–1.6438 obtained.

Purified bis (1,2,2-trichlorovinyl) disulfide is a yellow oil of B.$_{0.04}$ 115–118° C., $n_D^{20}$ 1.6432, $d_{20}^{20}$ 1.755, Cl 64.3% (theory 65.5%), S 20.1% (theory 19.7%). Its IR spectrum shows strong absorptions at 1540, 980, 888 and 750 cm.$^{-1}$.

The ease of dehydrochlorination increases in the order $(CCl_3CH_2)_2S_2 < (CHCl_2CHCl)_2S_2 < (CCl_3CHCl)_2S_2$ as is shown by the dehydrochlorination temperatures with triethylamine as follows:

Degrees centigrade
Bis(2,2,2-trichloroethyl) disulfide _____ 57–62
Bis(1,2,2-trichloroethyl) disulfide _____ 45–50
Bis(1,2,2,2-tetrachloroethyl) disulfide _____ 35–40

The new compounds of the present invention are useful as insecticides, fungicides, nematocides, and as flame retardants for wood and other cellulosic materials, etc.

I claim:
1. Symmetrical compounds having the formula

$$\begin{array}{c} Y\ X \qquad\quad A\ M \\ |\ | \qquad\qquad |\ | \\ ZC=C-S-S-C=C-Q \end{array}$$

where two of X, Y and Z are halogen of atomic weight between 35 and 80 and the remaining member of X, Y and Z is hydrogen and A, M and Q are defined the same as X, Y and Z.

2. Symmetrical bis(polychlorovinyl) disulfide wherein there are 2 chlorine atoms in each polychlorovinyl group.

3.
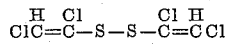
$$\begin{array}{c} H\ Cl \qquad\quad Cl\ H \\ ClC=C-S-S-C=CCl \end{array}$$

4.
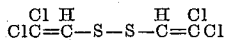
$$\begin{array}{c} Cl\ H \qquad\quad H\ Cl \\ ClC=C-S-S-C=CCl \end{array}$$

References Cited in the file of this patent
UNITED STATES PATENTS

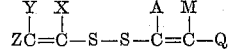

| 2,396,788 | Hoffmann | Mar. 19, 1946 |
| 2,451,411 | Raasch | Oct. 12, 1948 |
| 3,038,014 | Geering | June 5, 1962 |